No. 633,708. Patented Sept. 26, 1899.
M. SWENSON.
COTTON BALING PRESS.
(Application filed May 23, 1898.)
(No Model.) 5 Sheets—Sheet 1.

Fig. 1

Witnesses:
Jas. T. Coleman
Jno. R. Taylor

Inventor
Magnus Swenson
by Frank L. Dyer
Att'y.

No. 633,708. Patented Sept. 26, 1899.
M. SWENSON.
COTTON BALING PRESS.
(Application filed May 23, 1898.)

(No Model.) 5 Sheets—Sheet 4.

Witnesses:

Inventor
Magnus Swenson
by Frank L. Ayer
Att'y

UNITED STATES PATENT OFFICE.

MAGNUS SWENSON, OF CHICAGO, ILLINOIS, ASSIGNOR TO THE AMERICAN COTTON COMPANY, OF NEW YORK, N. Y.

COTTON-BALING PRESS.

SPECIFICATION forming part of Letters Patent No. 633,708, dated September 26, 1899.

Application filed May 23, 1898. Serial No. 681,420. (No model.)

*To all whom it may concern:*

Be it known that I, MAGNUS SWENSON, a citizen of the United States, residing at Chicago, in the county of Cook and State of Illinois, have invented a certain new and useful Improvement in Cotton-Baling Apparatus, of which the following is a specification.

My invention relates to various new and useful improvements in apparatus for making cotton-bales, and the invention refers especially to apparatus for making bales which are cylindrical in form by winding a continuous sheet or bat of cotton in convolutional layers around a spindle or core. In my improved apparatus I make use of a cotton-press for making these bales, which is of novel construction. Such a press may be employed either in connection with the specific apparatus forming the subject-matter of my present invention or it may be used alone as a single press in combination with any desired form of apparatus for making a sheet or bat of cotton.

The objects of my invention are, first, to produce a cotton-pressing apparatus of novel form capable of carrying on a continuous operation, by which is meant the formation of cylindrical bales without the stoppage of the gin plant or condenser; second, to provide an improved form of driving mechanism for a cylindrical cotton-press by which the relative separation of the rolls during the formation of the bale may be compensated for without affecting the continuous rotation thereof; third, to provide means in connection with such a press by which the rolls may be manipulated for the ejection of the finished bale and when a belt is employed, as is preferable, by which the said belt may be looped down beneath the core prior to the starting of a new bale; fourth, to provide improved means in connection with two cylindrical cotton-baling presses by which the sheet or bat coming from the bat-forming apparatus may be deflected alternately to the two presses, whereby the gin plant and condenser may be operated continuously; fifth, to provide improved pressure-producing mechanism for a cylindrical baling-press by means of which the pressure may be gradually increased upon the bale until the bale is partly formed and subsequently thereafter be maintained at a constant point; sixth, to provide improved means in connection with a cylindrical baling-press by which the movable pressure-roll may be always maintained in alinement with the core, notwithstanding the driving strains and any side thrust produced by an unequal accumulation of the cotton on the core; seventh, to provide improved means by which the finished bale may be covered while in the press with the desired tension, and, finally, to provide such other details of construction as may conduce to the production of a successful baling apparatus, all as will be more fully hereinafter described and claimed.

In order that my invention may be better understood, attention is directed to the accompanying drawings, forming a part of this specification, and in which—

In all of the above views corresponding parts are represented by the same numerals of reference.

The apparatus is illustrated as being located within a suitable building 1, which obviously forms no part of the present invention. Mounted on suitable skids or foundation-beams 2 are two presses 3 3', each of the general type heretofore suggested by me and comprising a baling-roll 4, mounted in fixed bearings, and a baling-roll 5, mounted in longitudinally-movable bearings. The two cast frames 6 of the presses are arranged end to end and at their centers are supported on a vertical frame 8, other frames 9 being used to carry the ends of said presses.

Figure 2:
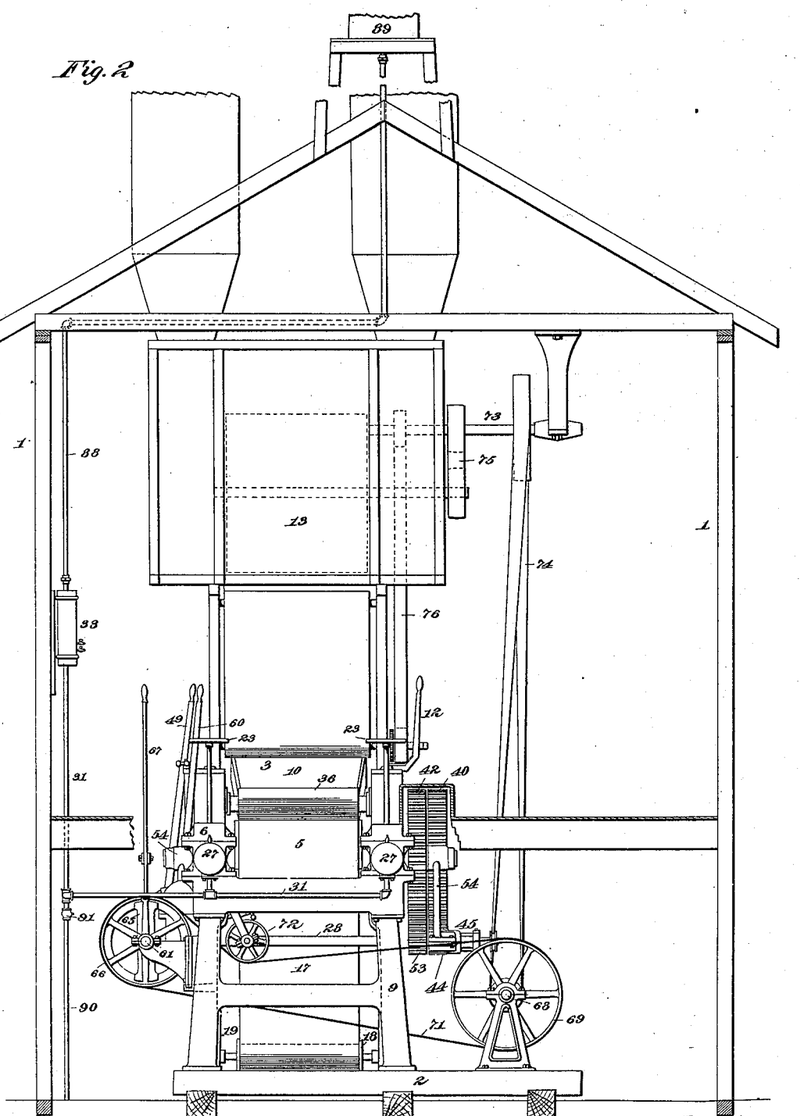
Fig. 2, an end elevation of Fig. 1.
Figure 3:
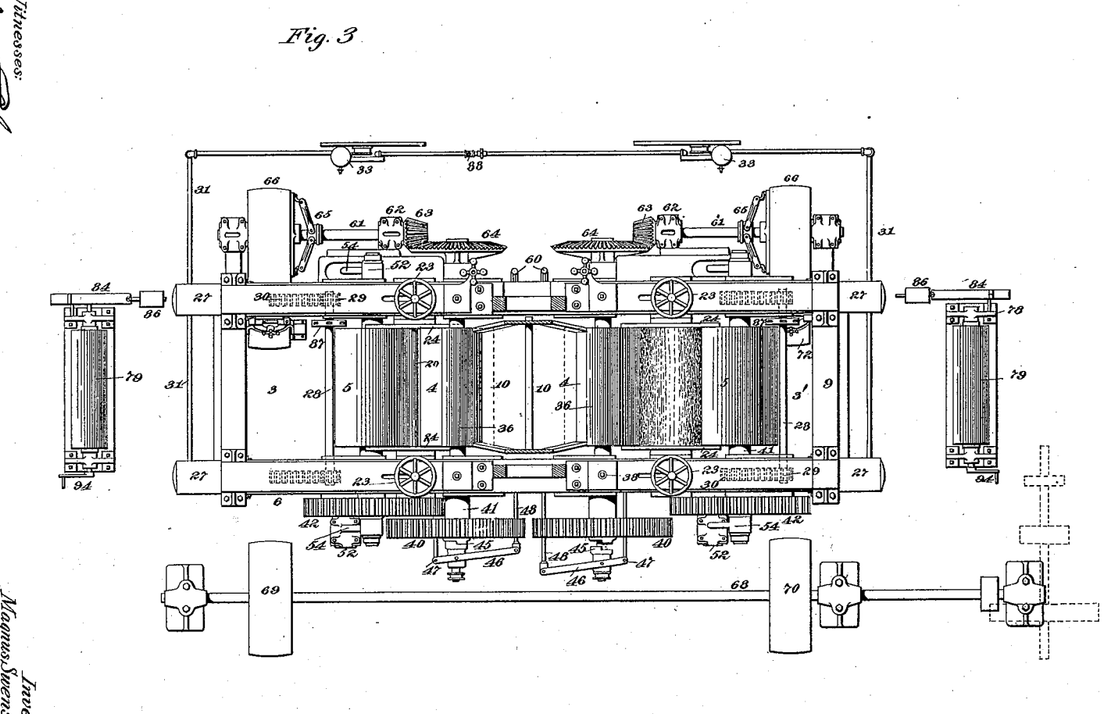
Fig. 3, a plan of the two presses shown in Fig. 1 with the bat-former removed.

10 10 represent two stationary aprons or boards inclined toward each other at their upper ends and carrying at the apex a hinged flap 11, which is operated from the side of the machine by means of a lever 12, as shown in Fig. 2. This flap works beneath a bat-former 13, which is shown as being of the type described and claimed by me in application for Letters Patent filed September 13, 1897, numbered serially 651,483. Obviously any other form of bat-forming apparatus may be employed. This bat-forming apparatus is provided in the flue 14, which carries the cotton from the gins, with a screen-section 15, having closed pockets 16 beneath the same. The purpose of this screen-section is to allow any dust or dirt carried by the cotton to pass through the same and accumulate in said pockets, from which the dust or dirt may be removed in any suitable way. Each press is preferably provided with an endless belt 17, which extends over an idler 18, working in vertical guideways 19 around the two baling-rolls 4 and 5 and under the core 20. The ends of this core are provided with recesses therein, (not shown,) with which a supporting-pin engages at each side, carried in a movable bearing-block 21, mounted in a horizontal guideway 22 in the main frame 6. Two hand-wheels 23 23 are used for disengaging the ends of the core in the well-known way. The bearing-blocks 21 also carry end plates 24 for building up the ends of the bale, as I have before described in patents and applications. The bearing-blocks 25 of the movable roll 5 of each press are mounted in the guideways 22, and each of said bearing-blocks connects with the plunger 26 of a hydraulic jack 27, the said jack being arranged in line with said movable bearing-blocks, so as to take up the direct thrust thereof. Mounted in the two bearing-blocks of each press is a shaft 28, carrying a pinion or gear-wheel 29, keyed thereto near each end thereof, and each of said pinions engages with a rack 30, mounted in the main frame 6. These racks 30 are preferably inverted, as shown, so that no dust or dirt can accumulate therein, whereby their bearing-surfaces will be always kept clean. The employment of the gears or pinions 29 on the shaft 28 provides for parallel movement of the two bearing-blocks 25 of each press, so that the movable roll will be always maintained in alinement irrespective of the driving strains or the irregular accumulation of cotton on the core 20.

Figure 1:
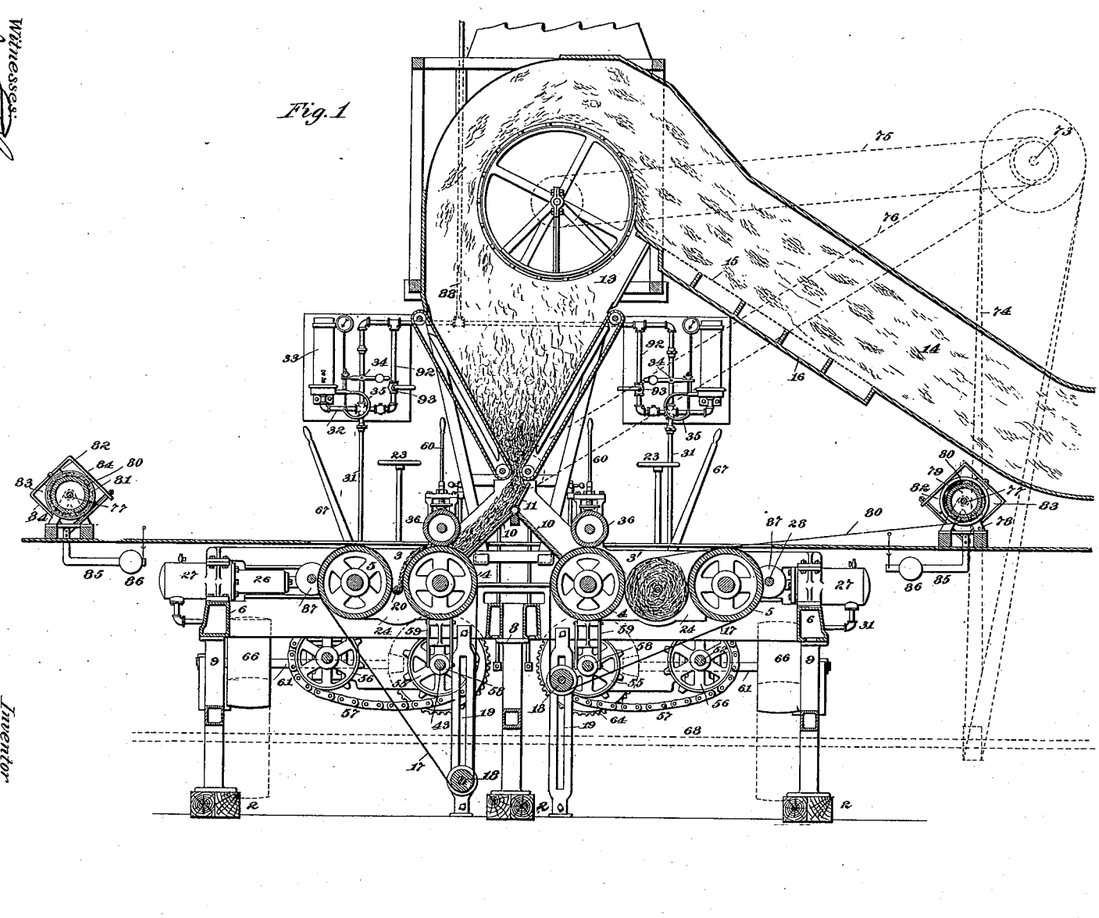
Figure 1 is a longitudinal sectional view of the preferred form of apparatus, illustrating two cylindrical baling-presses arranged back to back, with means for alternately feeding the sheet or bat to said presses.

In order to prevent the upward strain of the belt 17 on the core 20 from wearing out the bearings of the core, the latter is preferably arranged on a line slightly beneath the center line of the shafts of the baling-rolls 4 and 5, so that the upward thrust of said belt on the bale will be received by the peripheries of said rolls instead of upon the bearings of said core. When, however, a belt 17 is not employed, or if in some work the upward thrust of said belt is not sufficient to wear the bearings of said core, the latter may be arranged on exactly the same plane as the shafts of said baling-rolls. The two hydraulic jacks 27 of each press connect by a pipe 31 with a suitable pressure-producing mechanism. I find in practice that it is desirable to gradually increase the pressure on the bale from the start until the bale is about half formed, more or less, after which the pressure which has been reached at that time is maintained constant throughout the succeeding operations. To accomplish this end, I provide a branch pipe 32, leading to a closed air-chamber 33, in which air under the desired initial pressure is maintained. In the main line of the pipe 31 I place a valve 34, which is arranged to relieve the pressure in the pipe 31 when that pressure has reached the desired point and to maintain the pressure constant thereafter. Any suitable form of automatic valve for this purpose may be employed; but I prefer to use the valve which I have invented and which is described and claimed in my application for Letters Patent filed February 18, 1898, and numbered serially 670,806. With such a relief-valve I use a bent steel tube 35, closed at its outer end, which is connected to the handle of the valve 34 and with its inner end connecting with the air-chamber 33, so that the pressure within said chamber tends to straighten out the tube and open the valve. I find in practice that not only is it desirable to apply a very light pressure to the cotton at the start in order that there may be no danger of the preliminary layers becoming caked or matted, but it is also advisable in a press employing a belt to effect the pressure on those layers which immediately surround the core by the action of the belt alone, as in that way bales having centers as soft as the other portions may be obtained. This arrangement is shown in Fig. 1, which illustrates the roll 5 at its innermost position, the belt 17 being in contact with the core 20 and the baling-roll 5 being slightly removed from engagement with the belt immediately in line with the core. The relative separation of the baling-roll 5 from the belt at this point is slightly exaggerated in the drawings, as in ordinary operation it need not be greater than one-half inch.

In order to compress the sheet or bat coming down either of the aprons 10, I employ pressure-rollers 36, the journal-boxes of which are forced downward by means of heavy spiral springs 37, (see particularly Fig. 4,) the tension of which springs may be adjusted by means of screw-bolts 38. These pressure-rollers also tend to engage the belt tightly with the baling-roll 4 of each press and prevent the belt from having any tendency to slip relatively to said roll. It will be observed that the vertical guides 19 are arranged behind the center line of each stationary roll 4, whereby the belt will be engaged with an extended area on the movable baling-roll 5, which area increases as the bale enlarges, as shown at the right-hand side of Fig. 1. In this way I overcome the possibility of any slipping of the belt relatively to the movable baling-roll.

Figure 4:
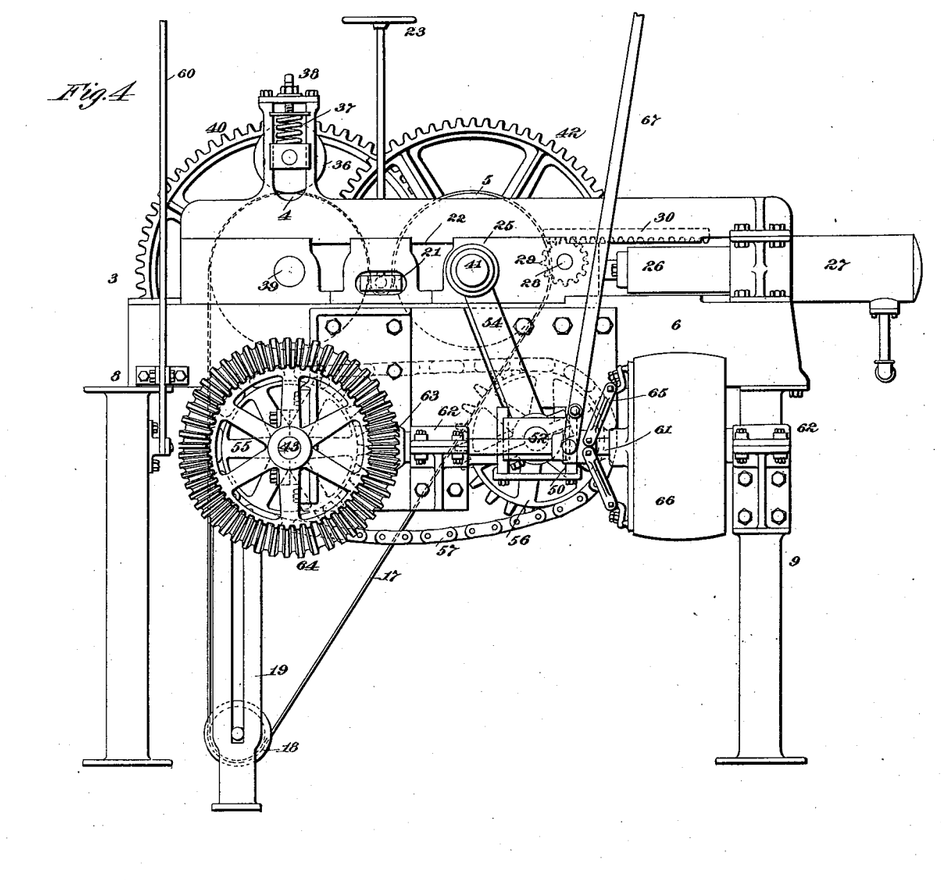
Fig. 4 a side elevation, on an enlarged scale, of one of the improved baling-presses.
Figure 5:
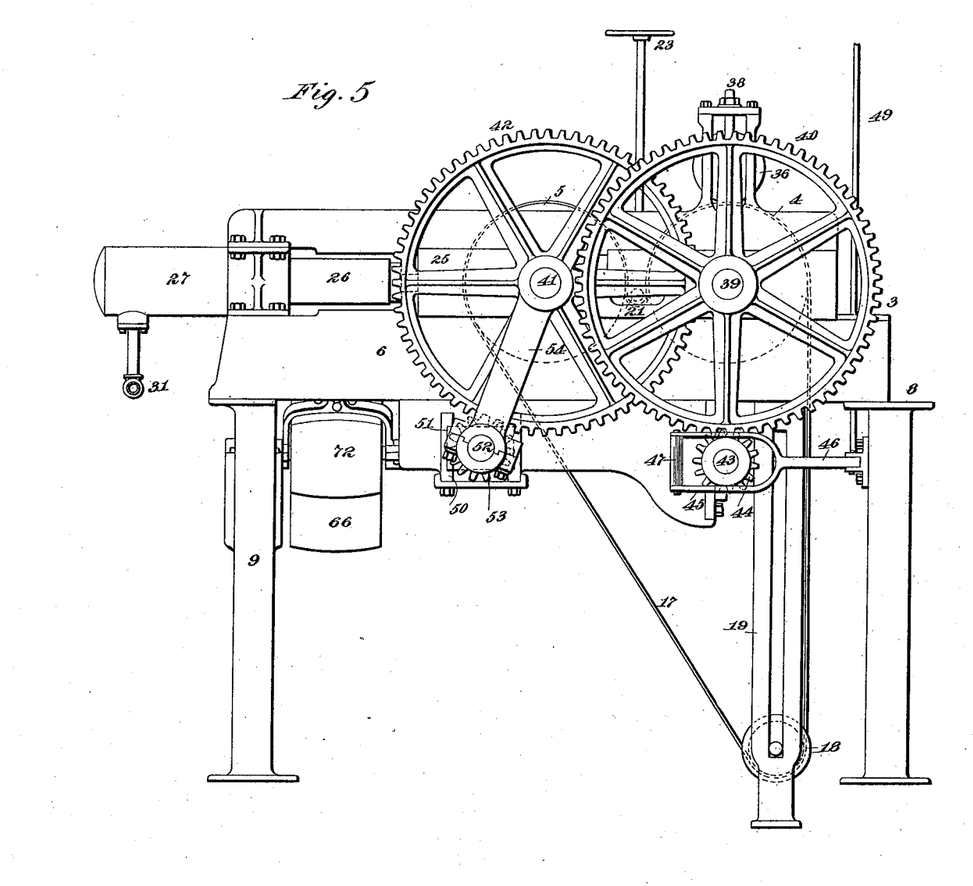
Fig. 5, a similar view from the other side of the press.

Means by which the baling-rolls are driven and which at the same time allow for the relative separation of the rolls are more clearly illustrated on an enlarged scale in Figs. 4 and 5. The shaft 39 of the stationary baling-roll is provided at one end with a large gear 40, keyed to said shaft, and the shaft 41 of the movable baling-roll is provided with a similar gear 42, keyed to said shaft at the same side of the machine. One of the gears 40 or 42 is arranged to work close to the side frame with the other of said gears on the outside thereof, whereby very large gears may be employed which actually overlap, as illustrated. The gear 42 is shown as working adjacent to the side frame, and the gear 40 is illustrated as being outside of and overlapping the same.

43 is a counter-shaft mounted beneath the frame and preferably in a vertical line with the shaft 39. The said counter-shaft is provided with a loose pinion 44 thereon, which pinion meshes with the gear 40. A clutch 45 on the counter-shaft 43 is arranged to connect the pinion 44 to the shaft 43 to rotate the said shaft. The said clutch is operated by a lever 46, pivoted at one side to a rod 47 and operated at the other end by a rod 48, which extends across the machine and is connected with a lever 49. By operating the lever 49 the pinion 44 may be clutched or unclutched from the counter-shaft 43, so as to arrest or start the baling-roll 4. The main frame of the machine is provided at each side with a short vertical slideway 50, and at each side a bearing-block 51 is mounted in said slideway. A counter-shaft 52 is mounted in these bearing-blocks 51 and extends across the machine. 53 is a pinion keyed to said counter-shaft 52 and meshing with the gear 42, the said pinion being the same size as the pinion 44.

54 54 are two links, one at each side of the machine, which links connect the shaft 41 of the movable baling-roll 5 with the ends of the counter-shaft 52, whereby the constant engagement between the pinion 53 and the gear 42 will be maintained at all times.

Motion is transmitted from the counter-shaft 43 to the counter-shaft 52 in any suitable way, but preferably by sprocket wheels and chain.

55 is a sprocket-wheel loose on the counter-shaft 43 and working inside of the hollow frame 6, and 56 is a similar sprocket-wheel of the same size keyed to the counter-shaft 52 and working within said hollow frame in line with the sprocket-wheel 55. A sprocket-chain 57 of any suitable type connects these two sprocket-wheels. Since the counter-shaft 52 moves but slightly with respect to the counter-shaft 43, the sprocket-chain 57 need be provided with but very little slack. In order that rotation of the baling-roll 5 may be arrested without arresting the rotation of the baling-roll 4, I prefer to employ a clutch 58 for clutching or unclutching the sprocket-wheel 55 from the counter-shaft 43, this clutch being shown particularly in Fig. 1. Said clutch is operated by a fork 59, the upper end of which is connected by a rod extending across the machine with a lever 60.

61 represents the main driving-shaft, mounted in boxes 62 at the side of the machine and extending lengthwise thereof and at right angles to the other shafts and counter-shafts, whereby compactness is secured. The main driving-shaft is provided with a bevel-pinion 63 at its inner end, which meshes with and drives a bevel-gear 64, keyed to the counter-shaft 43. When it is desired to stop the press, the friction-clutch 65 is used for connecting or disconnecting the driving-pulley 66 with the main driving-shaft 61. The said clutch 65 is operated by a lever 67, as shown.

The shafting, &c., for operating the press may be arranged in any suitable way. I illustrate a shaft 68 extending parallel with the shaft 61 beneath the press and carrying two main pulleys 69 and 70, arranged in line with the driving-pulleys 66 and connected to said pulleys by belts 71, adapted to be tightened by belt-tighteners 72, carried by the press and operated in any suitable way. I also illustrate a shaft 73, mounted in hangers at the top of the building at right angles to the shaft 68 and driven therefrom by a belt 74. The said shaft 73 operates belts 75 and 76 for driving the condenser-drum and the belts of the bat-former.

When a bale has been finished, I prefer to cover the same while in the press, this covering comprising either a thin strip wound spirally on the bale, as has been suggested, or a strip of canvas equal in width to the length of the bale, so as to be wound directly around the same. Each press may therefore be provided in front of it with a shaft 77, mounted in brackets 78 and carrying a drum 79, on which is wound a roll of canvas 80. Each drum is provided at one side with a friction-wheel 81, with which two friction-shoes 82 and 83 engage. These friction-shoes are adapted to be engaged with the periphery of the brake-wheel 81 by means of a divided frame 84, made in two sections adapted to be clamped together by a lever 85, having an adjustable weight 86 thereon.

If desired, each shaft 28 may be provided with a star-wheel 87, keyed to the same and having radial openings therein, in which a bar may be placed to rotate the shaft 28 for the purpose of moving the baling-roll 5 toward and away from the core 20 when necessary.

The pipe 31 of the pressure-producing device preferably extends upward at 88 to a receiving-tank 89, placed on top of the building and carrying a supply of water and by which a considerable head will be secured. Water may be supplied to the tank 89 as it leaks out of the system or becomes evaporated through a pipe 90, having a valve 91 therein, as shown in Fig. 2. In order to allow water to flow back from the tank 89 into the hydraulic jacks and around the valve 34, I make use of a by-pass 92, having a valve 93 therein, as shown in Fig. 1.

Assuming the apparatus to comprise all the elements illustrated in Fig. 1, its operation will be as follows, the parts being arranged in the positions shown: Cotton from the gin or gins and in the form of flakes or clots is blown in the usual way through the flue 14, and a large part of the dust or dirt carried by the cotton will be deposited in the pockets 16 through the perforated section 15. The cotton coming into contact with the condenser-cylinder, which is rotated by the belt 75 from the shaft 73, will allow the air to escape through the escape-flues, and the cotton will be thrown off of said condenser-cylinder by the centrifugal action, so as to be deposited in the lower convexed portion of the bat-former. This cotton will be gradually compressed by the forming-belts of the bat-former, which belts are driven by the belt 76 from the shaft 73, and will leave the space between the lower ends of said forming-belts in the shape of a thick, homogeneous, and coherent bat. This bat will be deflected by the flap or wing 11 under the conveying-apron 10 of the press 3. The baling-rolls 4 and 5 of that press will be operated by power from the shaft 68, driving the main driving-shaft 61. This shaft drives the bevel-pinion 63, which drives the bevel-gear 64 at a considerably lower speed. The counter-shaft 43, which is driven by the bevel-gear 64, drives the pinion 44, which drives the gear 41 of the stationary roll 4. The rotation of the counter-shaft 43 drives the sprocket-wheel 55 and through the chain 57 drives the sprocket-wheel 56 on the counter-shaft 52. That counter-shaft drives the pinion 53, which drives the gear 42 of the movable baling-roll 5. By reason of the large size of the gears 41, 42, and 64 and the small size of the pinions 44, 53, and 63 I allow for a relatively high speed of the main driving-shaft, so there is but little strain on the belting and line-shafting. The rotation of the baling-rolls 4 and 5 in the same direction and at the same peripheral speed drives the belt 17, causing the sheet or bat to be wound up on the core 20 after the sheet or bat has passed beneath the pressure-roll 36, by which its density is materially increased and a calendered or blanket-like appearance is imparted to the same. The sheet or bat is allowed to wind on the core 20 until a bale of the desired size is produced. In thus accumulating on said core it is subjected to two compressing factors. First, since the two baling-rolls are positively driven, the belt 17 in order to be looped downward with the enlarging bale requires to slip relatively to the moving baling-roll 5, and the friction produced by this relative slipping of the belt assists materially in the compression of the bale. The upward thrust on the core, which is produced by this pressure of the belt, is preferably taken up on the peripheries of the baling-rolls themselves, as I have before explained, by mounting the core 20 on a line slightly below the center line of the shafts of the baling-rolls. Second, the baling-roll 5 in moving backward with the enlarging bale is resisted by the hydraulic jacks 27 27, the water or other fluid from which is forced through the pipe 31 into the air-chamber 33, in which initial air-pressure has been generated. The entrance of this water into the air-chamber 33 serves to further compress the air therein, so that the resistance to the movement of the jack-pistons will be gradually increased. When, however, the pressure has reached a desired predetermined point, the valve 34 will be opened to allow the water to pass the said valve and to maintain the maximum pressure constant until the bale has been completed. When the bale is finished, the press 3' is started up, and the flap or wing 11 is swung over to the other side to automatically cut off the bat from the bat-former and direct it down the apron or chute 10 of the press 3', wherein the same operations take place.

It will be observed that as the baling-roll 5 is moved backward by the enlarging bale the links 54 will swing past the vertical center of the counter-shaft 52, so as to first lower the bearing-blocks 51 until the links 54 assume a perfectly vertical position and then to slightly elevate said blocks; but during this time the pinion 53 will be kept in constant engagement with the gear-wheel 42 and the counter-shaft 52 will be constantly rotated by the drive-chain.

When the bale is finished, it is ready to be covered, which may be done with the apparatus shown, the end of the strip of canvas or other material being applied to the bale and being wound around the same by the action of the press, the necessary tension being applied to said strip by means of the friction-shoes 82 working on the brake-wheel 81. The covering is then cut off and may be wound out of the way by means of a small crank 94 on the shaft of the drum 79. The covered bale is now ready to be removed. This is done, preferably, by arresting the rotation of the baling-roll 4 by operating the lever 49, so as to disengage the pinion 44 from the gear 41, and (the ends of the core having been released) the continued rotation of the baling-roll 5 will stretch the belt directly between and tangentially to the peripheries of the two baling-rolls, so as to elevate the bale above the press, from which position it may be removed in any suitable way. In order that the belt may be again looped downward beneath the line of the core, the baling-roll 4 is again brought into operation and the rotation of the baling-roll 5 is arrested by operating the clutch 58 to disengage the sprocket-wheel 55 from the counter-shaft 43. The rotation of the baling-roll 4 will then loop the belt downward between the two baling-rolls, as will be understood, and a new core will be placed in position ready for the reception of the new bale.

In order to return the baling-roll 5 to its normal position in contact with the belt, in line with the core, or nearly so, the valve 93 is opened and the water-pressure from the tank 89 will operate the hydraulic jacks to expel the pistons and move the baling-roll 5 toward its starting position. When for any reason it is desired to move the baling-roll 5 away from the baling-roll 4, the valve 93 will be, preferably, first opened, and the shaft 28 will be then rotated by means of a bar working in the openings in the star-wheel 87, so as to roll the pinions 28 29 on the racks 30, as will be understood.

While for large plants using a considerable number of gins it is desirable in order to secure economy of operation to make use of a duplex press such as I have described, as in that way the gins and condenser may operate continuously, it will yet be understood that one of the improved baling-presses may be used in connection with any desired type of bat-forming apparatus or that, if desired, two of said presses may be used in connection with other apparatus, by which a continuous operation may be carried on.

Having now described my invention, what I claim as new, and desire to secure by Letters Patent, is as follows:

1. An improved cotton-baling apparatus comprising in combination a pair of two-roll baling-presses for making cylindrical cotton-bales, two inclined aprons or chutes leading to said presses, the said aprons or chutes extending toward each other, and a bat-forming device for directing a continuous sheet or bat of cotton to the apex of the aprons or chutes, substantially as set forth.

2. An improved cotton-baling apparatus comprising in combination a pair of two-roll baling-presses for making cylindrical cotton-bales, two inclined aprons or chutes leading to said presses, the said aprons or chutes extending toward each other, a flap or wing at the apex of said chutes, and a bat-forming device for directing a continuous sheet or bat of cotton to the apex of the aprons or chutes, substantially as set forth.

3. An improved bat-forming apparatus comprising a pair of two-roll horizontal baling-presses arranged end to end, two inclined aprons or chutes connected together at their upper ends, and a bat-forming apparatus for directing a continuous sheet or bat to the apex of said aprons or chutes, substantially as set forth.

4. An improved bat-forming apparatus comprising a pair of two-roll horizontal baling-presses arranged end to end, two inclined aprons or chutes connected together at their upper ends, a bat-forming apparatus for directing a continuous sheet or bat to the apex of said aprons or chutes, and a wing or flap at the apex of said aprons or chutes for directing the bat to one press or to the other, substantially as set forth.

5. In a cotton-press, the combination of a baling-roll mounted in fixed bearing-boxes, a baling-roll mounted in movable bearing-boxes, a core, a hydraulic jack for resisting the movement of the movable baling-roll, an air-chamber to which water from said jack is conveyed, a relief-valve beyond the air-chamber, said valve opening only when a definite pressure is reached, and a by-pass around the relief-valve, substantially as set forth.

6. In a cotton-press, the combination of a baling-roll mounted in fixed bearing-boxes, a baling-roll mounted in movable bearing-boxes, a core, a hydraulic jack for resisting the movement of the movable baling-roll, an air-chamber to which water from said jack is conveyed, a relief-valve beyond the air-chamber, said valve opening only when a definite pressure is reached, a by-pass around the relief-valve, and a supply-tank by which a normal head or pressure will be maintained, substantially as set forth.

7. In a cotton-press, the combination of two baling-rolls, a core between the baling-rolls, and a continuous belt or apron extending over said rolls and under said core, the baling-rolls, at their innermost position, being out of contact with the belt where it passes around the core, whereby the inner layers of the bale will be formed by the action of the belt alone and the subsequent layers will be compressed by the combined action of the belt and baling-rolls, substantially as set forth.

8. In a cotton-press, the combination of two baling-rolls, a continuous belt or apron extending over said rolls, and a core between said rolls around which the belt extends in an opposite direction, the said core being mounted out of line with the shafts of the rolls, whereby the thrust of the belt will be received upon the peripheries of the baling-rolls, substantially as set forth.

9. In a baling-press, the combination with two baling-rolls mounted in a horizontal plane, of an endless belt extending over said baling-rolls, and a core beneath which the belt extends, said core being mounted below the plane of the shafts of the baling-rolls, substantially as and for the purposes set forth.

10. In a cotton-press, the combination of a baling-roll mounted in stationary bearings, a counter-shaft mounted in fixed bearings, connections between said counter-shaft and said baling-roll, a baling-roll mounted in movable bearings, a counter-shaft mounted in bearings movable at right angles to the bearings of said baling-roll, connections between the two counter-shafts, and connections between the movable counter-shaft and the movable baling-roll, substantially as set forth.

11. In a cotton-press, the combination of a baling-roll mounted in stationary bearings, a counter-shaft mounted in fixed bearings, connections between said counter-shaft and said baling-roll, a baling-roll mounted in movable bearings, a counter-shaft mounted in bearings movable at right angles to the bearings of said baling-roll, connections between the two counter-shafts, connections between the movable counter-shaft and the movable baling-roll, and links connecting the shaft of the movable baling-roll with said counter-shaft, substantially as set forth.

12. In a cotton-press, the combination of a baling-roll mounted in stationary bearings, a counter-shaft mounted in fixed bearings, connections between said counter-shaft and said baling-roll, a baling-roll mounted in movable bearings, a counter-shaft mounted in bearings movable at right angles to the bearings of said baling-roll, connections between the two counter-shafts, connections between the movable counter-shaft and the movable baling-roll, links connecting the shaft of the movable baling-roll with said counter-shaft, a sprocket-wheel on each of the counter-shafts, and a chain connecting said sprocket-wheels, substantially as set forth.

13. In a cotton-press, the combination of a baling-roll mounted in stationary bearings, a counter-shaft mounted in fixed bearings, connections between said counter-shafts and said baling-roll, a baling-roll mounted in movable bearings, a counter-shaft mounted in bearings movable at right angles to the bearings of said baling-roll, connections between the two counter-shafts, connections between the movable counter-shaft and the movable baling-roll, and clutches for disengaging either of said baling-rolls, substantially as set forth.

14. In a cotton-press, the combination of a baling-roll mounted in stationary bearing-blocks, a counter-shaft mounted in fixed bearings, a gear-wheel on the shaft of said baling-roll, a pinion on the counter-shaft engaging the said gear-wheel, a baling-roll mounted in movable bearing-blocks, a gear-wheel on the shaft of said movable baling-roll, a counter-shaft mounted in bearing-blocks movable at right angles to the bearing-blocks of the movable baling-roll, links connecting the shaft of the movable baling-roll with said counter-shaft, a gear on the shaft of the movable baling-roll, a pinion on the movable counter-shaft meshing with said gear, and connections between the two counter-shafts, substantially as set forth.

15. In a cotton-press, the combination of a baling-roll mounted in stationary bearing-blocks, a counter-shaft mounted in fixed bearings, a gear-wheel on the shaft of said baling-roll, a pinion on the counter-shaft engaging the said gear-wheel, a baling-roll mounted in movable bearing-blocks, a gear-wheel on the shaft of said movable baling-roll, a counter-shaft mounted in bearing-blocks movable at right angles to the bearing-blocks of the movable baling-roll, links connecting the shaft of the movable baling-roll with said counter-shaft, a gear on the shaft of the movable baling-roll, a pinion on the movable counter-shaft meshing with said gear, and connections between the two counter-shafts, the gears on the two baling-rolls being arranged in different planes so as to overlap each other, substantially as set forth.

16. In a cotton-press, the combination with a baling-roll mounted in stationary bearing-blocks, a counter-shaft mounted in fixed bearings, a gear on said baling-roll, a pinion on said counter-shaft engaging the said gear, a baling-roll mounted in movable bearing-blocks, a counter-shaft mounted in bearing-blocks movable at right angles to the bearing-blocks of said movable baling-roll, links connecting the shaft of the movable baling-roll with said movable counter-shaft, a gear on the shaft of the movable baling-roll, a pinion on said movable counter-shaft meshing with said gear, a sprocket-wheel on each of the counter-shafts, chains connecting said sprocket-wheels, a clutch for engaging or disengaging the pinion on the stationary counter-shaft, and a clutch for engaging and disengaging the sprocket-wheel on the stationary counter-shaft, substantially as set forth.

This specification signed and witnessed this 22d day of April, 1898.

MAGNUS SWENSON.

Witnesses:
 FRANK L. DYER,
 JNO. R. TAYLOR.